(12) United States Patent
Henderson

(10) Patent No.: US 7,649,560 B2
(45) Date of Patent: Jan. 19, 2010

(54) SOLID STATE IMAGE SENSORS

(75) Inventor: Robert Henderson, Edinburgh (GB)

(73) Assignee: STMicroelectronics Limited, Marlow-Buckinhamshire (GB)

( * ) Notice: Subject to any disclaimer, the term of this patent is extended or adjusted under 35 U.S.C. 154(b) by 796 days.

(21) Appl. No.: 11/145,438

(22) Filed: Jun. 3, 2005

(65) Prior Publication Data
US 2005/0269609 A1 Dec. 8, 2005

(30) Foreign Application Priority Data
Jun. 5, 2004 (EP) ............................ 04253372

(51) Int. Cl.
*H04N 3/14* (2006.01)
*H01L 31/113* (2006.01)
(52) U.S. Cl. .......................... 348/308; 257/292
(58) Field of Classification Search ................. 348/272, 348/273
See application file for complete search history.

(56) References Cited
U.S. PATENT DOCUMENTS
6,661,457 B1 * 12/2003 Mathur et al. ............... 348/273
6,943,837 B1 * 9/2005 Booth, Jr. .................... 348/297
7,057,652 B2 * 6/2006 Watanabe ..................... 348/272
2002/0063787 A1 5/2002 Watanabe ..................... 348/272

FOREIGN PATENT DOCUMENTS
EP 0 707 417 4/1996
WO 01/13649 2/2001

\* cited by examiner

*Primary Examiner*—Sinh Tran
*Assistant Examiner*—Dillon Durnford-Geszvain
(74) *Attorney, Agent, or Firm*—Lisa K. Jorgenson; Allen, Dyer, Doppelt, Milbrath & Gilchrist, P.A.

(57) ABSTRACT

A pinned-photodiode image sensor using shared output amplifiers, for example output amplifiers in the 2.5T arrangement has transfer gate control lines alternating or cross-coupled between successive columns or adjacent rows. This assists in removing row-row mismatches. In preferred embodiments, the approach is applied to Bayer pattern RGB sensors, and allows the gain and/or the exposure of green pixels to be controlled separately from those of red and blue pixels.

12 Claims, 4 Drawing Sheets

FIG. 4a

| B11 | G21 | B31 | G41 | B51 | G61 | B71 | G81 | B91 | G101 | B111 | G121 |
|-----|-----|-----|-----|-----|-----|-----|-----|-----|------|------|------|
| G12 | R22 | G32 | R42 | G52 | R62 | G72 | R82 | G92 | R102 | G112 | R122 |
| B13 | G23 | B33 | G43 | B53 | G63 | B73 | G83 | B93 | G103 | B113 | G123 |
| G14 | R24 | G34 | R44 | G54 | R64 | G74 | R84 | G94 | R104 | G114 | R124 |

FIG. 4b

| G12 | G21 | G32 | G41 | G52 | G61 | G72 | G81 | G92 | G101 | G112 | G121 |
|-----|-----|-----|-----|-----|-----|-----|-----|-----|------|------|------|
| B11 | R22 | B31 | R42 | B51 | R62 | B71 | R82 | B91 | R102 | B111 | R122 |
| G14 | G23 | G34 | G43 | G54 | G63 | G74 | G83 | G94 | G103 | G114 | G123 |
| B13 | R24 | B33 | R44 | B53 | R64 | B73 | R84 | B93 | R104 | B113 | R124 |

SOLID STATE IMAGE SENSORS

FIELD OF THE INVENTION

The present invention relates to readout structures in solid state image sensors, and is particularly related to pinned-photodiode image sensors providing red, green, blue (RGB) outputs.

BACKGROUND OF THE INVENTION

It is well known to use pinned-photodiode arrangements where a single output amplifier serves more than one pixel, for example in the so-called 2.5T pixel where two pixels share a total of five transistors, or the 1.75T pixel where four pixels share a total of seven transistors. For color images, the pixels are overlaid with color filtering material, most commonly RGB. The arrangement which is most commonly used is the Bayer pattern where the pixels are BGBGBG . . . and GRGRGR . . . in alternate rows.

A problem with the Bayer pattern (and potentially also with other RGB sensors) is that with the materials typically used, green pixels are more sensitive than red and blue pixels because of the different color filter absorption coefficients. It would be desirable to reduce this difference by appropriate adjustment as between green and red/blue of exposure and/or gain, but this has not yet been accomplished.

SUMMARY OF THE INVENTION

The present invention provides a solid state image sensor having an array of pixels, each pixel having a pinned photodiode and a transfer gate operable to provide a photodiode signal to an output amplifier. A common output amplifier is shared by a plurality of pixels in a plurality of adjacent rows in each column. A horizontal transfer gate control line is provided per row of the array. Each of the transfer gate control lines is connected in successive columns to a different one of the plurality of rows in a cyclical manner.

In preferred embodiments, the invention is applied to sensors in which the pixels are provided with red, green and blue color filters arranged in a Bayer pattern. In one embodiment the arrangement is such that pairs of pixels in adjacent rows of each column share a common output amplifier, and each of the transfer gate control lines alternates between the rows of a pair in alternate columns. In another embodiment, each output amplifier is shared by four pixels in four adjacent rows, and the four adjacent rows have two pairs of transfer gate control lines, each of the transfer gate control lines alternating between a pair of rows in alternate columns.

The invention also provides a digital camera, preferably a color digital camera, making use of the above image sensor. From another aspect, the invention provides a method of reading out image data from a pinned-photodiode image sensor having an array of pixels, and in which a common output amplifier is shared by a plurality of pixels in a plurality of adjacent rows in each column. The method comprises causing pixel values to be transferred to the output amplifiers in a sequence such that a pixel in a given row of a column is followed by a pixel in an adjacent row of the succeeding column.

BRIEF DESCRIPTION OF THE DRAWINGS

Embodiments of the invention will now be described, by way of example only, with reference to the drawings, in which:

FIG. 4a is a chart illustrating the color distribution of pixels in a Bayer pattern; and FIG. 4b is a chart showing the order in which the pixels are read out from the embodiments of FIGS. 2 and 3.

DETAILED DESCRIPTION OF THE PREFERRED EMBODIMENTS

Figure 1:
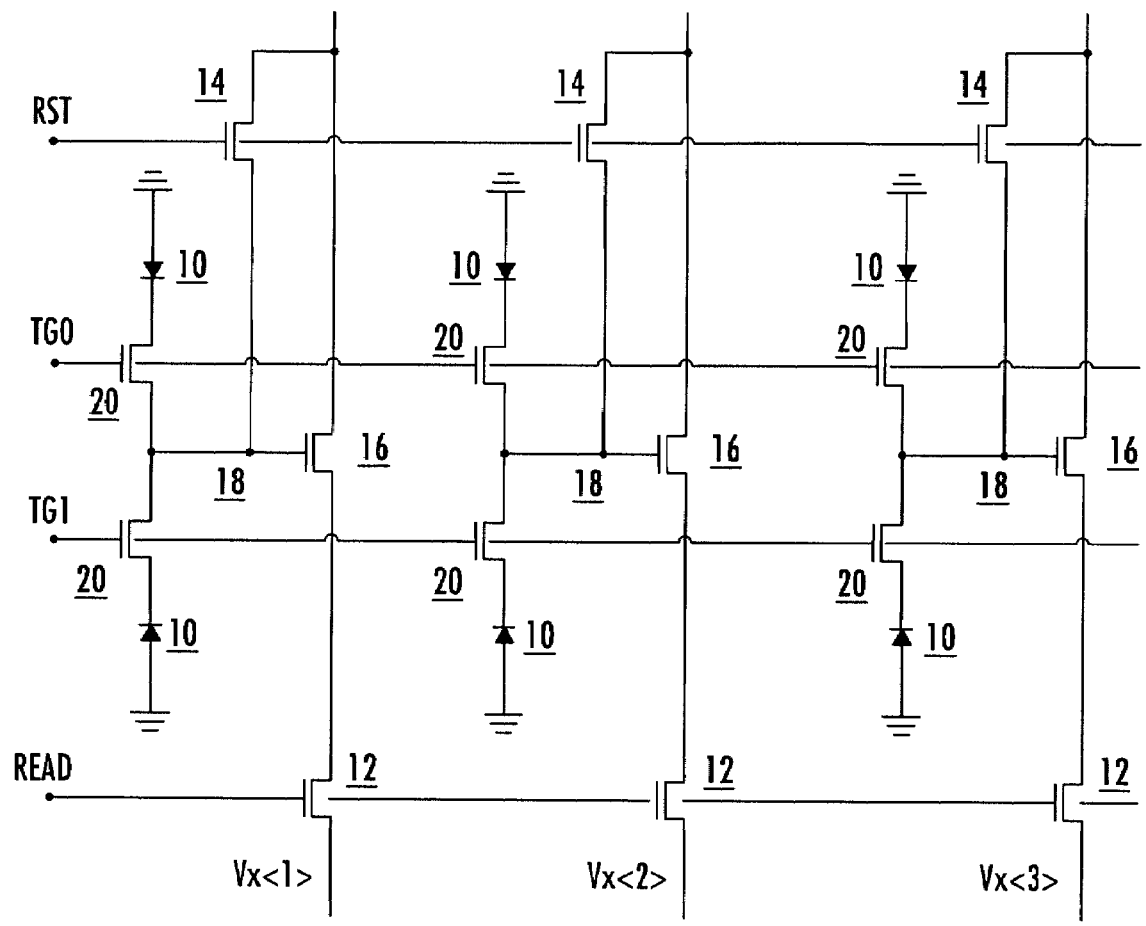
FIG. 1 is a schematic diagram of part of a prior art 2.5T pixel image sensor.

Referring to FIG. 1, six pixels are shown of a pixel array in a CMOS pinned-photodiode image sensor chip. Each pixel comprises a photodiode 10. Pixel readout is on a respective column line Vx under the control of READ line acting on transistors 12. Reset voltages are applied from RST line via reset transistors 14. Pairs of photodiodes 10 share a common output amplifier formed by transistor 16, with photodiode signals being transferred at different times to floating diffusion 18 by transfer gates 20 controlled by transfer gate lines TG0 and TG1.

Figure 2:
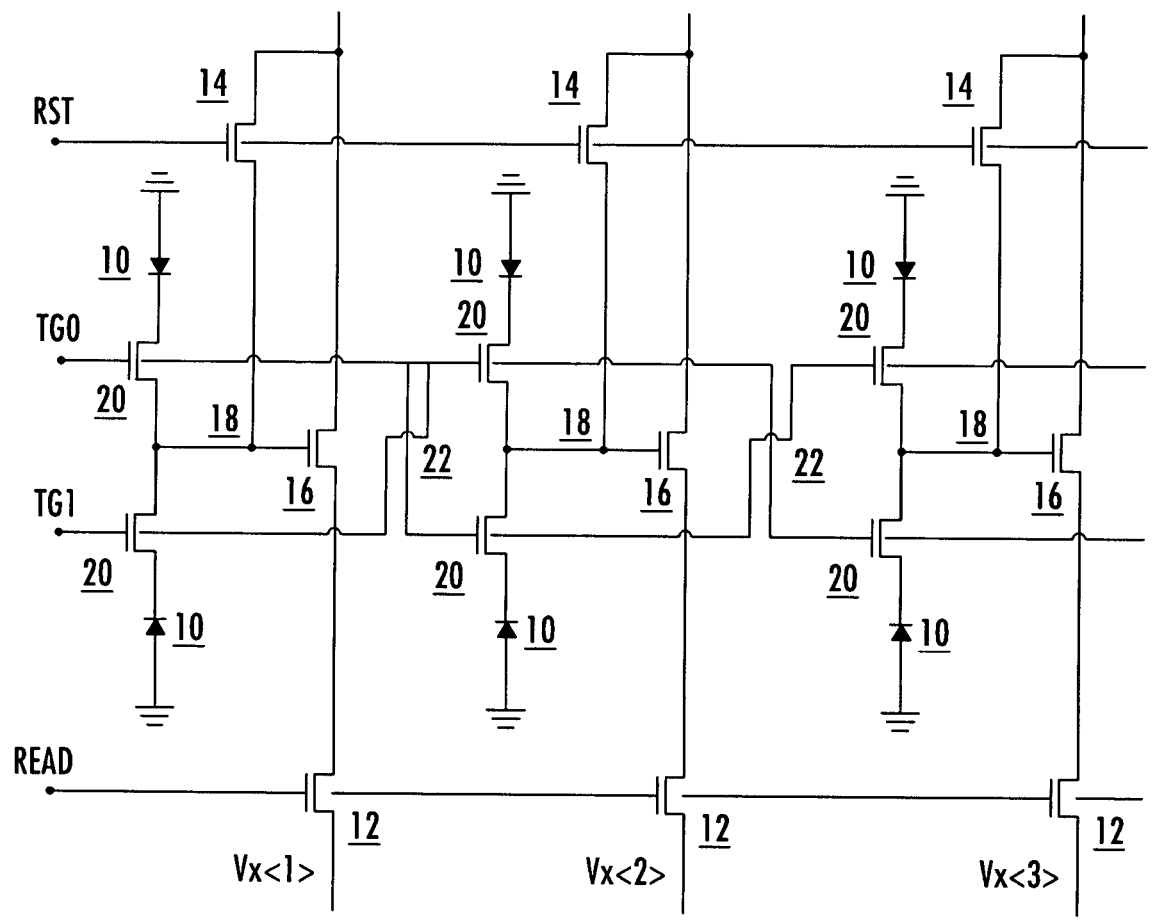
FIG. 2 is a schematic diagram of a 2.5T pixel image sensor of an embodiment of the present invention.

FIG. 2 illustrates one embodiment of the invention. In FIG. 2 similar parts are denoted by like reference numbers and will not be further described. In FIG. 2 the transfer gate control lines TG0 and TG1 are interchanged, or cross-coupled, between alternate columns as shown at 22. This has the effect that the order of readout in each pair of rows alternates between columns.

As one example, FIG. 4a shows the layout of color pixels in a conventional Bayer pattern, rows of B and G pixels alternating with rows of G and R. With the arrangement of FIG. 2, all of the green pixels from a pair of adjacent rows are read out, followed by the blue and red pixels for those rows. The readout may be used in this format if coupled with suitable processing circuitry. Alternatively, the readout may be converted to the standard format by use of a line memory and multiplexer.

The altered readout format from the image surface has a number of advantages. The exposure of green and red/blue pixels can be adjusted independently, allowing the dynamic range of the pixels to be optimized. The exposure of the red/blue pixels can be increased with respect to the green to maximize the signal to noise ratio. Alternatively, the exposure of the green pixels can be reduced to minimize dark current. Also, different analog gain can be applied to green pixels than to red/blue, which allows the signal to quantization noise level to be optimized. Because green pixels are read out on the same line, mismatches in the gain and offset of the two green pixels in a Bayer quad can be eliminated. Similarly, mismatches in the gain and offset of red/blue pixels are eliminated. The operation of 2.5T pixels typically gives rise to row-row mismatches caused by the sequence of operations in reading the upper row followed by the lower row. In the present invention, these mismatches are translated into column-column mismatches which can be removed by vertical fixed pattern noise learning and subtraction. This advantage is not limited to color images.

Figure 3:
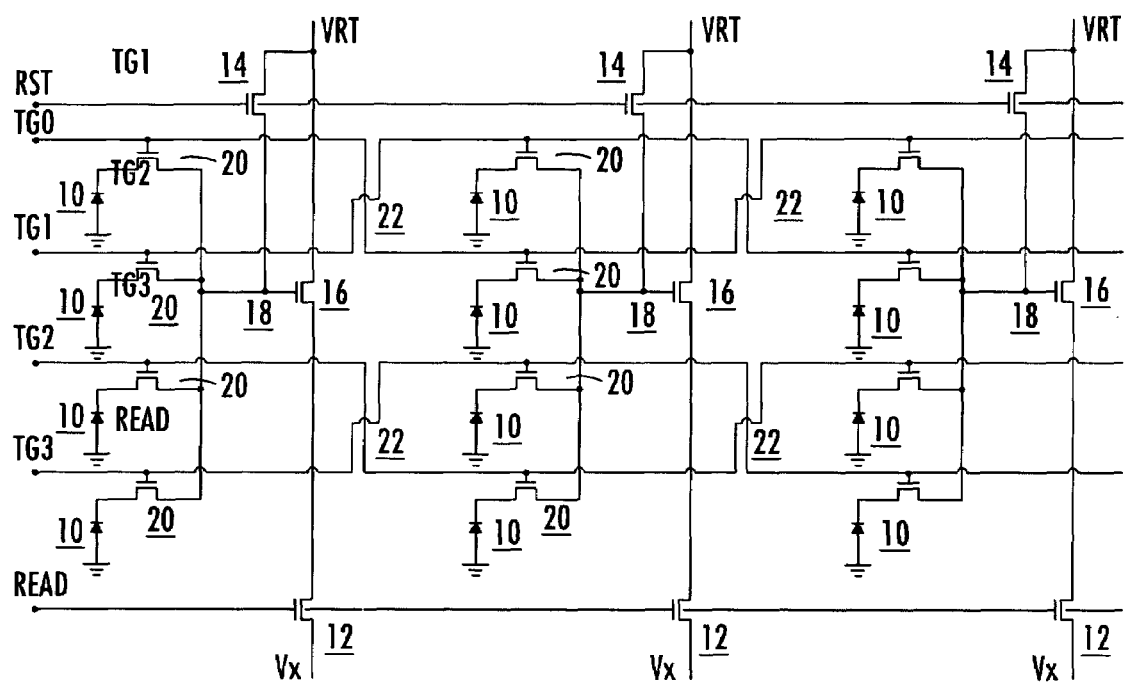
FIG. 3 is a schematic diagram of an embodiment of the invention as applied to a 1.75T pixel image sensor.

FIG. 3 shows that the same cross-coupling is possible in other pinned photodiode pixel structures such as the 1.75T arrangement. In this case, four pixels 10 share a common output amplifier 16, and the transfer gate lines are cross-coupled in pairs, namely TG0, TG1 and TG2, TG3. It is also possible in principle to cross-couple more than two transfer gate lines. For example, pixels in three adjacent rows could share a common output amplifier, with the transfer gate lines cycling between the three rows in adjacent columns as in row 0, row 1, row 2, row 0 etc.

The image sensor of the invention may be incorporated in a digital camera, a lens or lens system being provided to focus the desired image on an image plane of the sensor. The invention is particularly useful in digital color cameras.

That which is claimed is:

1. A solid state image sensor comprising:
   an array of pixels arranged in rows and columns, each pixel having a photodiode and a transfer gate operable to provide a photodiode signal to an output amplifier;
   a plurality of output amplifiers, a plurality of pixels in a plurality of adjacent rows in each column sharing a common output amplifier; and
   a plurality of transfer gate control lines, a transfer gate control line being provided per row of the array and being connected in successive columns to a different row of the plurality of rows;
   wherein at least pairs of pixels in adjacent rows of each column share the common output amplifier, and each of the transfer gate control lines alternates between the rows of a pair of pixels in alternate columns.

2. An image sensor according to claim 1, wherein each output amplifier is shared by four pixels in four adjacent rows, and the four adjacent rows have two pairs off transfer gate control lines with each of the transfer gate control lines alternating between a pair of rows in alternate columns.

3. An image sensor according to claim 1, wherein the pixels comprise red, green and blue color filters arranged in a Bayer pattern.

4. An image sensor according to claim 3, wherein a gain of green pixels is different from a gain of red and blue pixels.

5. An image sensor according to claim 3, wherein an exposure of green pixels is different from an exposure of red and blue pixels.

6. A method of reading out image data from a photodiode image sensor having an array of pixels, and in which a common output amplifier is shared by at least pairs of pixels of adjacent rows in each column of the array, each of a plurality of transfer gate control lines being provided per row of the array and being connected in successive columns to a different row of the plurality of rows, and each of the transfer gate control lines alternates between the rows of a pair of pixels in alternate columns, the method comprising:
   pixel readout by transferring pixel values to the output amplifiers in a sequence such that a pixel in a given row of a column is followed by a pixel in an adjacent row of a succeeding column, wherein pixel readout alternates between two adjacent rows.

7. A method according to claim 6, wherein the pixels are provided with red, green, blue filters arranged in a Bayer pattern, and wherein all the green pixels of two adjacent rows are read out before reading out the red and blue pixels of the two adjacent rows.

8. A digital camera comprising:
   a solid state image sensor having an image plane; and
   a lens arranged to focus an image of a desired scene on the image plane of the solid state image sensor;
   said image sensor comprising
      an array of pixels arranged in rows and columns, each pixel having a pinned photodiode and a transfer gate operable to provide a photodiode signal to an output amplifier,
      a plurality of output amplifiers, a plurality of pixels in a plurality of adjacent rows in each column sharing a common output amplifier, and
      a plurality of transfer gate control lines, a transfer gate control line being provided per row of the array and being connected in successive columns to a different row of the plurality of rows,
      wherein at least pairs of pixels in adjacent rows of each column share the common output amplifier, and each of the transfer gate control lines alternates between the rows of a pair of pixels in alternate columns.

9. A digital camera according to claim 8, wherein each output amplifier is shared by four pixels in four adjacent rows, and the four adjacent rows have two pairs of transfer gate control lines with each of the transfer gate control lines alternating between a pair of rows in alternate columns.

10. A digital camera according to claim 8, wherein the array of pixels comprises red, green and blue color filters arranged in a Bayer pattern.

11. A digital camera according to claim 10, wherein a gain of green pixels is different from a gain of red and blue pixels.

12. A digital camera according to claim 10, wherein an exposure of green pixels is different from an exposure of red and blue pixels.

* * * * *

UNITED STATES PATENT AND TRADEMARK OFFICE
CERTIFICATE OF CORRECTION

PATENT NO. : 7,649,560 B2  Page 1 of 1
APPLICATION NO. : 11/145438
DATED : January 19, 2010
INVENTOR(S) : Robert Henderson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1265 days.

Signed and Sealed this

Twenty-eighth Day of December, 2010

David J. Kappos
*Director of the United States Patent and Trademark Office*